Patented Nov. 6, 1923.

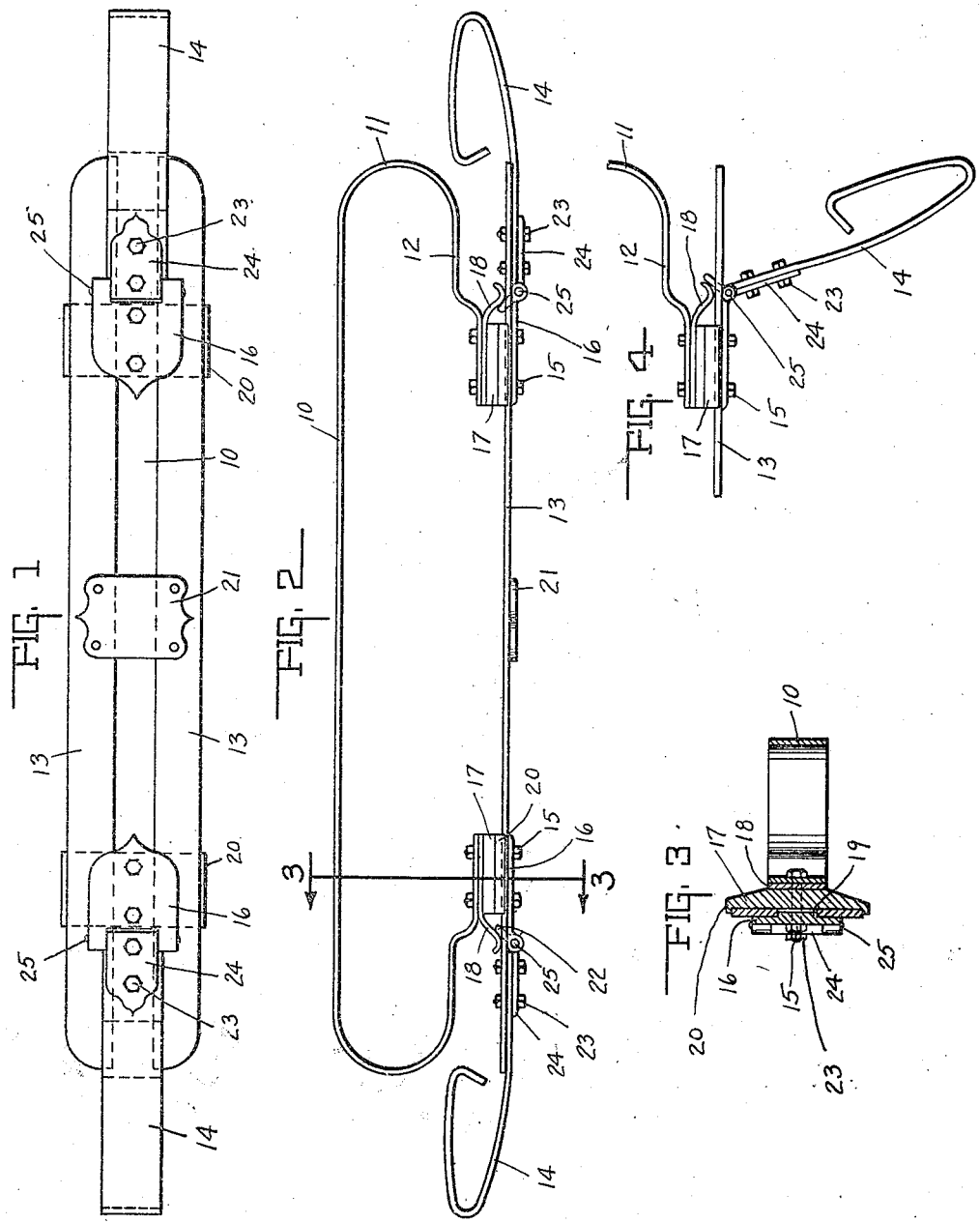

1,473,371

UNITED STATES PATENT OFFICE.

CHARLES C. HIMES, OF INDIANAPOLIS, INDIANA.

VEHICLE BUMPER.

Application filed May 7, 1923. Serial No. 637,235.

*To all whom it may concern:*

Be it known that I, CHARLES C. HIMES, a citizen of the United States, and a resident of Indianapolis, county of Marion, and State of Indiana, have invented a certain new and useful Vehicle Bumper; and I do hereby declare that the following is a full, clear, and exact description thereof, reference being had to the accompanying drawings, in which like numerals refer to like parts.

This invention relates to a bumper for a vehicle, particularly for use on a motor vehicle.

It has been observed that the usual type of vehicle bumper must be shorter than the full width of the vehicle, therby exposing the fenders to damage from collision. Where effort is made to protect the fender by causing the bumper to extend to the outer edges thereof or beyond, the ends of the bumper often catch on garage doors or vehicles standing along the side, while being backed away. With particular reference to automobiles, it is often necessary to make a turn while backing out of a parking space or garage, thus throwing the front of the vehicle laterally so that the projecting end of the bumper will catch on an adjacent object, and not only damage the object, but bend or otherwise damage the bumper.

It is the object of this invention to provide a bumper having hinged ends so constructed that when the end of the bumper is in collision in one direction, it will rigidly hold its position and protect the vehicle upon which it is mounted, but when it is in collision with an object from the rear, as when the vehicle is backing out, the force will overcome the spring tension and the end of the bumper will swing forwardly on a hinge connection, thereby giving way and preventing damage.

The full nature of this invention will be understood from the accompanying drawings and the following description and claims.

In the drawings Fig. 1 is a front elevation of the bumper structure. Fig. 2 is a plan view thereof. Fig 3 is a section taken on the line 3—3 of Fig. 2. Fig. 4 is a plan view of one end of the bumper showing the projecting end swung out from normal position.

In the drawings there is shown a bumper comprising a single rear bar 10 which may be secured to the front or back of a vehicle in any suitable manner. The bar 10 is formed of spring steel or suitable material for resisting a shock or collision. It is bent at the ends 11 and doubled on itself as at 12 so as to give a cushion or spring effect in the usual manner. Rigidly secured to the inwardly bent end portions 12 of the bar 10, there are a pair of forwardly positioned bars 13 spaced from each other, and of a length substantially that of the rear bar 10 with its curved portions 11.

Pivotally or hingedly mounted adjacent each end of the bars 13 there are end extensions 14 which extend outwardly an appreciable distance beyond the ends of the bars 10 and 13 and are then bent rearwardly and inwardly in substantially a U-shaped formation.

The bars 13 are rigidly secured to the portions 12 of the bar 10 by the bolts 15 which extend through a hinge plate 16 positioned adjacent the forward face of the bars 13, spacing block 17, spring latch 18 and portion 12 of the bar 10. The hinge plate 16 is provided with the central projection 19 extending inwardly therefrom between the bars 13 for maintaining them in spaced relation, and the block 17 is provided with forwardly extending flanges 20 for gripping the outer edges of the bars 13 and maintaining them in proper position. In the center of the bars 13 there may also be secured a spacing plate 21 having a spacing projection thereon adapted to extend between said bars, which may be secured thereon by rivets or suitable means and bear a monogram or the like, if desired.

The springs 18 are bent forwardly to a point adjacent the bars 13 and the inner surface of the extensions 14, in position to engage or be engaged by, the projection 22 which may be rigidly secured to or formed integral with the hinged end of the projection 14. Said extension 14 is securely bolted, by means of the bolts 23, to the hinge plate 24 which is hingedly connected with the hinge plate 16, by means of the hinge pin 25.

In normal position the extension members 14 of the bumper lie adjacent and against the ends of the bars 13, with their in-turned ends extending adjacent the curved portion 11 or portion 12 of the bar 10. Said members will be maintained in normal position by the spring 18 yieldingly bearing against the projection 22. If the extension members of the bumper are in collision with an object, they will sustain the shock by reason of their engagement with the ends of the bars 13 and if violent enough, the shock will be further absorbed by their engagement with the portions 12 of the bar 10. On the other hand if, in backing out of a place, the end members of the bumper are caught on an object, such as a door frame or adjacent vehicle, instead of damaging the same, it will be forced about this hinge joint against the pressure of the spring 18. This spring pressure being easily overcome, will permit the end members 14 to be thrown into the position shown in Fig. 4, thereby preventing any damage being done to either the bumper or the object engaged. By reason of this arrangement a longer bumper may be used without danger of obstruction while backing and, therefore, greater protection will be given to the vehicle, and particularly the fenders and tires.

The invention claimed is:

1. A bumper for vehicles having a pair of spaced bumper bars, means for rigidly securing said bumper bars upon a vehicle, extension members hingedly mounted adjacent the ends of said bumper bars and having inwardly curved outer ends, and yielding means rigidly secured to said bumper bars for normally maintaining said members in alignment therewith and permitting them to swing away therefrom under sufficient force to overcome the tension of said yielding means.

2. A bumper bar for vehicles having a pair of spaced bumper bars, spacing blocks for supporting said bars in spaced relation to each other, means for securing said blocks and bars upon the vehicle, a single extension bar hingedly mounted adjacent the ends of said bumper bars, and a leaf spring secured to said blocks for normally maintaining said members in alignment with said bars and permitting them to swing away therefrom under sufficient force to overcome the tension of said springs.

3. A bumper for vehicles having a pair of spaced bumper bars, clamping members for securing said bars in spaced relation to each other, means for supporting said bars upon the vehicle, extension bars hingedly mounted on said members and extending outwardly beyond the ends of said bumper bars, a leaf spring rigidly secured with respect to said bumper bars, and ears secured on said extension bars in position to become engaged by said springs for normally maintaining said extension bars in alignment with said bumper bars and permitting them to be released and swung away therefrom under sufficient force to overcome the tension of said yielding means.

4. A bumper for vehicles having a supporting spring bar provided with inwardly extending ends, a pair of spaced bumper bars rigidly secured to the inwardly extending ends of said supporting bar, extension members hingedly mounted adjacent the ends of said bumper bars and having inwardly turned ends extending adjacent the inwardly turned ends of said supporting bar, and yielding means rigidly secured with respect to said bars for normally maintaining said members in alignment with said bumper bars and permitting them to swing away therefrom under sufficient force to overcome the tension of said yielding means.

In witness whereof, I have hereunto affixed my signature.

CHARLES C. HIMES.